United States Patent [19]
Akamatsu et al.

[11] 3,984,752
[45] Oct. 5, 1976

[54] ELECTRICAL VALVE CIRCUIT APPARATUS

[75] Inventors: Masahiko Akamatsu; Isamu Hosono; Takao Kawabata, all of Amagasaki, Japan

[73] Assignee: Mitsubishi Denki Kabushiki Kaisha, Tokyo, Japan

[22] Filed: Oct. 29, 1974

[21] Appl. No.: 518,786

[30] Foreign Application Priority Data
Oct. 30, 1973  Japan.............................. 48-122054

[52] U.S. Cl................................ 321/45 C; 321/2; 321/27 R
[51] Int. Cl.².................................. H02M 7/515
[58] Field of Search.................. 321/5, 27 R, 45 C, 2

[56] References Cited
UNITED STATES PATENTS
3,710,215   1/1973   Johnston...................... 321/45 C X Primary Examiner—William M. Shoop
Attorney, Agent, or Firm—Oblon, Fisher, Spivak, McClelland & Maier

[57] ABSTRACT

An electrical valve circuit apparatus which comprises an electrical valve circuit comprising a plurality of main control electrical valves operationally connected between a main DC circuit system and a main AC circuit system, at least one pair of commutating arms composed of at least two main control electrical valves for sequentially commutating the current, at least one arm of the group of commutating arms is an auxiliary DC circuit system, and an auxiliary electrical valve apparatus and an auxiliary power source connected in series to the auxiliary DC circuit system.

9 Claims, 4 Drawing Figures

ELECTRICAL VALVE CIRCUIT APPARATUS

BACKGROUND OF THE INVENTION

1. Field of the Invention

The present invention relates to an electrical valve circuit connected to a variable voltage AC circuit system.

2. Description of the Prior Art

In a DC-AC rectifier for driving a synchronous motor or a DC-AC rectifier for imparting secondary excitation of a wound-rotor type induction motor, it is necessary to use an electrical valve circuit apparatus for the DC-AC rectifying which is connected to the variable voltage AC circuit system. In the electrical valve circuit apparatus employed for this a problem of the commutation between the electrical valves should be considered when the voltage of the AC circuit system is low. Heretofore, it has been proposed to employ a forcible commutating method by using commutating capacitors or an interrupting commutating method by using electrical valve circuit apparatus having a back-to-back connection.

However, in the former method, the commutating means for forcible commutation is rather complicated. Further, when high voltage application is desired, the voltage applied to the forcible commutating means and the electrical valves should be high resulting in rather high expense.

In the latter method, the current of the DC circuit system is interrupted whereby the power feed to the AC circuit system is also interrupted. Accordingly, the effective current is decreased and the torque of the motor is decreased. Also, the vibration and noise are generated by the change of the torque caused by the current interruption. Accordingly such large capacity apparatus has met with problems.

SUMMARY OF THE INVENTION

It is an object of the present invention to overcome the disadvantages of the conventional apparatus.

It is a further object of the present invention to provide an electrical valve circuit apparatus which imparts reliable commutating operation with novel commutating means having no electrical interruption and which has a simple structure even though the the voltage of the AC circuit system is low.

It is another object of the invention to provide an electrical valve circuit apparatus suitable for apparatus having relatively high voltage and large capacity.

The foregoing and other objects are attained in accordance with one aspect of the present invention through the provision of an electrical valve circuit apparatus which comprises a plurality of main control electrical valves operationally connected between the main DC circuit system and the main AC circuit system, at least one pair of commutating arms composed of at least two of the main control electrical valves for sequentially commutating the current, at least one arm of the group of commutating arms is an auxiliary DC circuit system and an auxiliary electrical valve apparatus operationally connected between the auxiliary DC circuit system and the auxiliary power source.

The auxiliary power source can be a three-phase transformer or a single-phase transformer. The auxiliary electrical valve apparatus can be a bridge circuit using a thyristor or a half-waveform circuit using a combination of a thyristor and a diode. The neutral point of the secondary winding of the three-phase transformer is connected to one end of the main DC circuit system. Each auxilary electrical valve such as one end of the thyristor is connected in series to the other end of the secondary windings. The other ends of the thyristors are commonly connected and are connected in series to the main control electrical valve.

When the auxiliary power source and the auxiliary electrical valve apparatus are simplified, a single phase transformer can be used as the auxiliary power source and a single phase half-waveform circuit composed of a diode and a thyristor can be used as the auxiliary electrical valve apparatus. The invention can be used for a single phase middle tap type electrical valve circuit apparatus having the smallest number of arms as the electrical valve circuit. In the latter case, the auxiliary electrical valve apparatus and the auxiliary power source are connected to only one side of the main control electrical valve arm.

BRIEF DESCRIPTION OF THE DRAWING

Various objects, features and attendant advantages of the present invention will be more fully appreciated as the same becomes better understood from the following detailed description of the present invention when considered in connection with the accompanying drawings, in which.

DETAILED DESCRIPTION OF THE PREFERRED EMBODIMENTS

Figure 1:
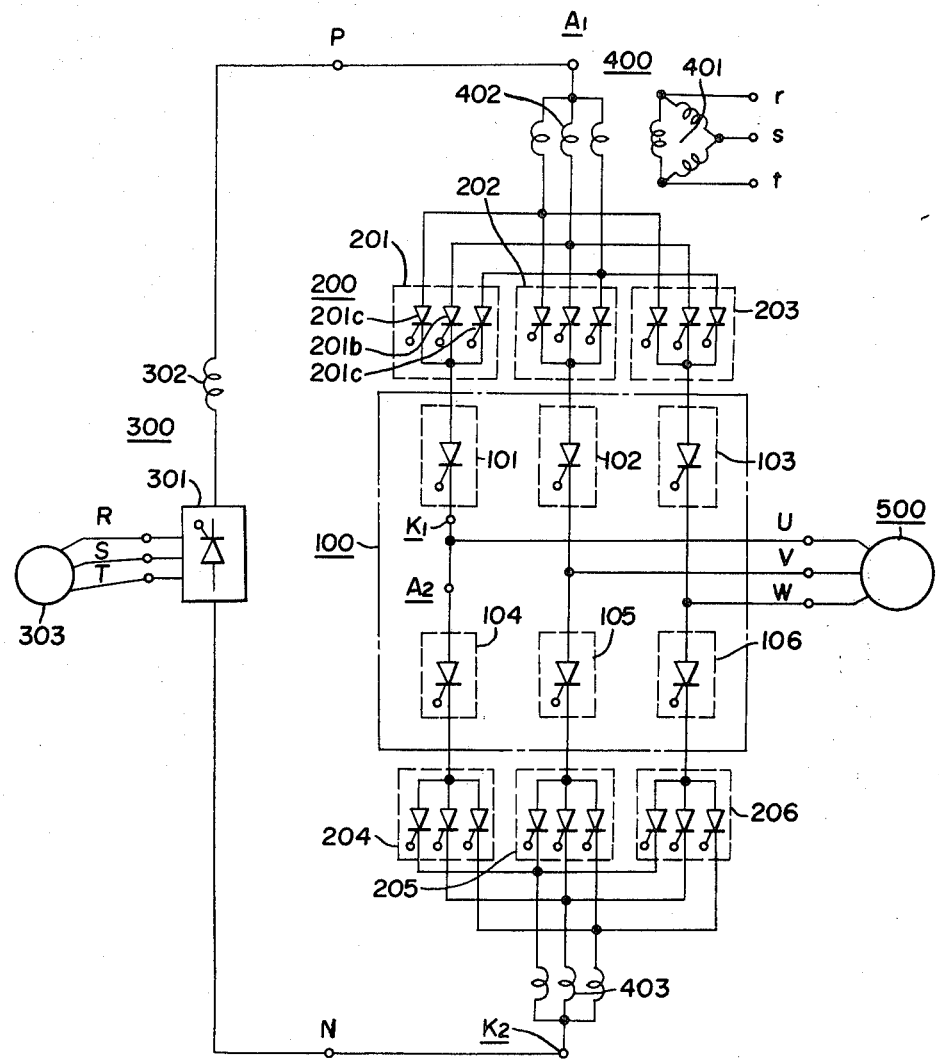
FIG. 1 is a diagram of one embodiment of the electrical valve circuit apparatus according to the invention.

Referring now to the drawings, wherein like reference numerals designate identical or corresponding parts throughout the several views, and more particularly to FIG. 1 thereof, FIG. 1 is a diagram of one embodiment of the electircal valve apparatus of the invention. In the electrical valve circuit composed of main control electrical valves 101–106 such as thyristors which are operationally connected between the DC terminals P, N connected to the main DC circuit system 300 and the terminals U, V, W connected to the main AC circuit system, the main electrical valves comprise positive commutating arms 101, 102, 103 and netagive commutating arms 104, 105, 106. Moreover, sub-electrical valve circuits 201–206 are connected to the main electrical valve arms 101–106 to form one sub-DC circuit system.

In this embodiment, the sub-electrical valve circuits are connected for simplification to the positive common sub-AC circuit system 402 and the negative common sub-AC circuit systems 403. Moreover, the sub-AC circuit system comprises the secondary winding of the transformer 400, the neutral points of the secondary windings are respectively connected to DC terminals P, N and the primary winding is connected to the AC power source connecting the main DC circuit system 300 or the other AC power source.

The commutating operatoin in the low frequency and low voltage state of the main AC circuit system 500 in which commutation is important will now be described.

When the main control electrical valves 101, 106 are turned on, current is passed through main DC circuit system 300 — sub-electrical valve circuit 201 — main control electrical valve 101 — main AC circuit system 500 — main control electrical valve 106 — sub-electrical valve circuit 206. In the sub-electrical valve circuit 201, the plurality of sub-electrical valves 201a – 201c are sequentially turned on depending upon the frequency of the sub-AC circuit system. A similar operation occurs in the sub-electrical valve circuit 206. In this case, the power fed to the main AC circuit system 500 is determined by the algebraic addition of the power of the main DC circuit system 300 and the power of the sub-electrical valve circuits 201, 206.

When the current is commutated from the main control electrical valve 101 to the main control electrical valve 102, a turn-on signal is given to the main control electrical valve 102, the turn-on phase of the sub-electrical valve circuit 201 is delayed and the turn-on phase of the sub-electrical valve circuit 202 is effected whereby the current passing through the sub-electrical valve circuit 201 and the main control electrical valve 101 is decreased to zero. On the other hand, the current passing through the electrical valve circuit 202 and the main control electrical valve 102 is increased until all of the current of the main DC circuit system 300 passes therethrough.

During the commutating operation, the potential difference for overcoming the starting force or the impedance voltage in the low voltage state of the main AC circuit system can be maintained by the turn-on phase difference between the sub-electrical valve circuits 201 and 202. The commutation is performed, in the same manner, so as to sequentially turn-on the control whereby the power conversion bewteen DC and AC is effected. When the voltage of the main AC circuit system 500 is high enough (for example 5 –10% higher than the rated voltage) the main control electrical valves 101–106 can be commutated by the starting force of the main AC circuit system 500. Accordingly, the voltage of the sub-AC circuit systems 402, 403 transmitted to the sub-electrical valve circuit can be about 2.5 –5%. Thus, the withstand voltage of the electrical valve can be several % of the withstand voltage of the main electrical valve. That is, the capacity of the sub-electrical valve circuit can be several % of the main conversion power.

Figure 2:
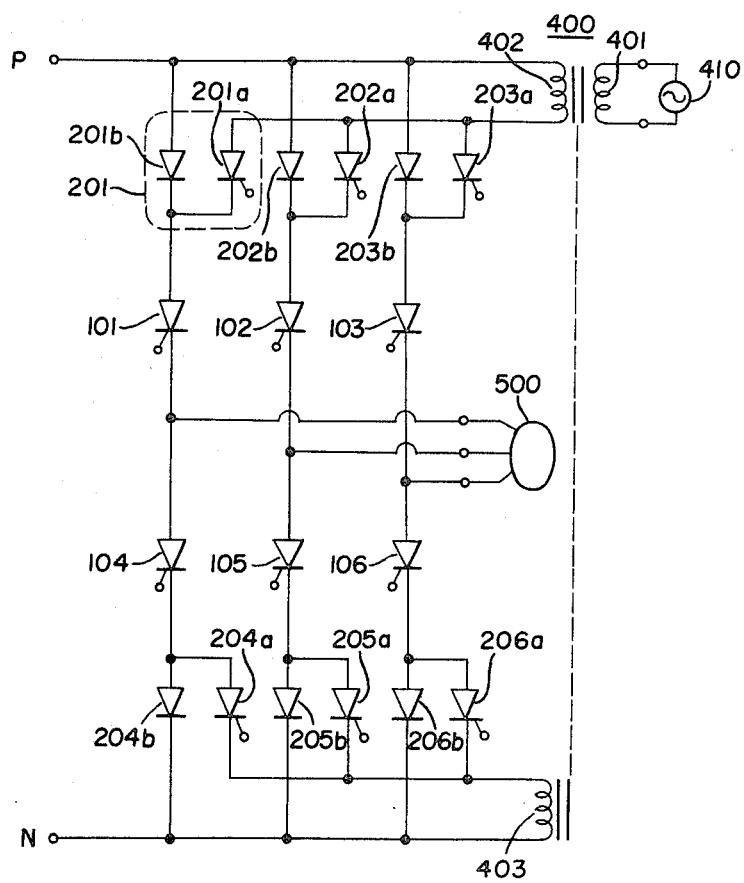
FIGS. 2 and 3 are, respectively, diagrams of other embodiments of the invention.

FIG. 2 is a diagram of another embodiment of the invention, wherein the sub-electrical valve circuit for simplification is a single-phase half-wave type. In this embodiment, the sub-electrical valve circuit 201 is composed of a single-phase sub-AC circuit system 402, a control electrical valve 201a such as a thyristor and a non-control electrical valve 201b such as a diode. The other sub-electrical valve circuits have similar structure. The embodiment is preferably utilized when the frequency of the main AC circuit system 500 is relatively lower than the frequency of the sub-AC circuit system 410. For example, when the rated frequency of the main AC circuit system is 20–30 Hz, the frequency of the sub-AC circuit system of the sub-electrical valve circuit for commutating by the voltage of several % of that of the main AC circuit system and the frequency of several % of that of the main circuit system can be 50–60 Hz. On the other hand, when the rated frequency of the main AC circuit system is high, the frequency of the sub-AC circuit system 401 can be increased depending upon the rated frequency. For example, a high frequency signal phase inverter may be connected as an auxiliary power source or the voltage may be applied only during the term of commutating. Accordingly, the pulse power source can be used in the sub-AC circuit system.

Figure 3:
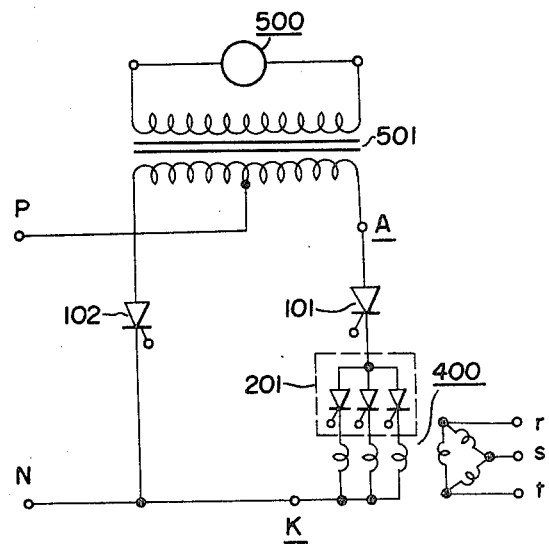

FIG. 3 is a diagram of one embodiment of the single-phase middle tap type main electrical valve circuit apparatus having the smallest number of arms. In FIG. 3, when the commutation is performed from the main control electrical valve 102 to the main control electrical valve 101, the turn-on phase of the sub-electrical valve circuit 201 is effected to form a forward convert region. After the commutation, the turn-on phase is the middle turn-on phase 90° for the rectifier commutation. When the commutation is performed from the main control electrical valve 101 to the main control electrical valve 102 the turn-on phase of the sub-electrical valve circuit 201 is delayed to form the reverse convert region whereby the current of the main control electrical valve 101 decreases and the current of the main control electrical valve 102 increases to complete the commutation to render the main control electrical valve 101 extinct. In this embodiment, the commutation in both directions can be performed by connecting the sub-electrical valve circuit to only one side of the main electrical valve arm.

FIGS. 4a – 4c are, respectively, embodiments showing the relation between the sub-electrical valve circuit and the main control electrical valve. In the invention, the main electrical valve arm of the main control electrical valves 100n is a sub-DC circuit system and the sub-electrical valve circuits 200n are connected in series to the DC circuit system. The sub-electrical valve circuit can be the bridge type of FIG. 4a, the double star type of FIG. 4b, or the three-phase half-waveform type having a fly-wheel diode of FIG. 4c, etc. The sub-electrical valve circuits having many rectifying phases (commutating arms) shown in FIGS. 4a, 4b are suitable for high frequency. The sub-electrical valve circuit having the fly-wheel diode shown in FIG. 4c can decrease the capacity of the control sub-electrical valve and sub-AC circuit system since the current can be passed through the control sub-electrical valve only during the commutation period and the current can be passed through the fly-wheel diode that is the non-control sub-electrical valve in the normal state (other than the commutation period).

Figure 4:
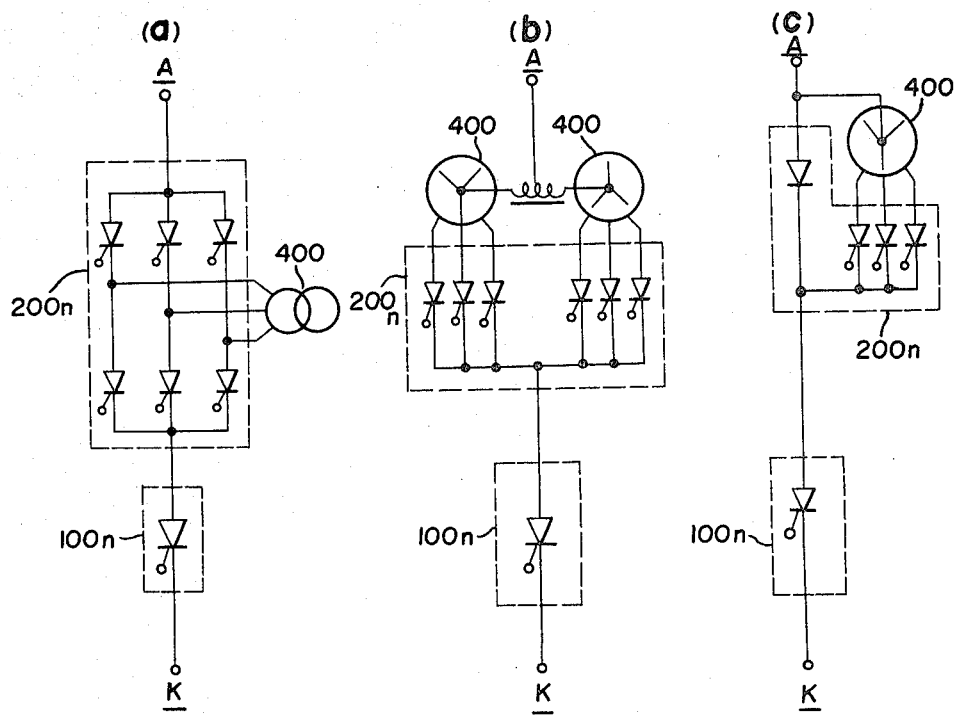
FIGS. 4a, 4b, 4c are diagrams of embodiments of electrical valve units of the invention.

A pair of the main control electrical valves and the sub-electrical valve circuit of FIG. 4 form one arm unit. Various DC-AC power rectifiers having various numbers of arms and arm connections can be utilized. In the apparatus having high voltage and large capacity, a high voltage element or high voltage valve (series connection) can be used as the main control electrical valve and a low voltage element or a non-series element can be used as a sub-electrical valve. In accordance with the invention, the commutating capacitor is not required for forcible commutation and the vibration caused by the capacitor or the generation and application of high voltage can be prevented. Accordingly, the apparatus is suitable for high voltage apparatus. The output powers of the sub-electrical valve circuits are algebraically added for effective utilization. Moreover, when the main AC circuit system 500 is high voltage, the commutation by the sub-electrical valve circuit is not required, the voltage of the sub-AC circuit system is turned off and the sub-electrical valve circuit is simultaneously controlled to turn-on with thte main control electrical valve whereby the transformer operates as a simple DC reactor and the sub-electrical valve can share the applied voltage as a part of the main control electrical valve. Accordingly, the sub-electrical valve can be effectively utilized as a part of the main control electrical valve.

In accordance with the invention, the degree of utilization of the elements is high and the operation is simple so that it is quite effective for an apparatus having large capacity. Moreover, commutation under low voltage is performed by the power outer-exciting commutation whereby the commutation is reliable and the overload withstand can be increased. Accordingly, the starting torque of the driving motor can be easily increased. Moreover, the current is not interrupted so that vibration and noise are not generated. Thus, the invention possesses numerous advantages.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. An electrical valve circuit comprising:
   a plurality of main control electrical valves operationally connected between a main DC circuit system and a main AC circuit system,
   at least one group of commutating arms comprising at least two of the main control electrical valves for sequentially commutating the current,
   auxiliary voltage applying means connected in series to at least one commutating arm of the commutating arms group,
   a commutating loop comprising at least said two main control electrical valves and said main AC circuit system,
   whereby when current is commutated from one of said two main control electrical valves to the other of said two main control electrical valves the voltage of the auxiliary voltage applying means is applied in a forward polarity to said other of said two main control electrical valves.

2. The electrical valve circuit according to claim 1 wherein the auxiliary voltage applying means comprises an auxiliary electrical valve and an auxiliary power source.

3. The electrical valve circuit according to claim 2 wherein the auxiliary power source comprises an auxiliary AC power source.

4. Electrical apparatus comprising:
   a main DC circuit system,
   a positive common sub AC circuit system comprising first, second and third windings,
   first, second and third sub electrical valve circuits each comprising first, second and third control elements,
   first, second and third positive commutating arms each comprising a main control electrical valve,
   a main AC circuit system,
   first, second and third negative commutating arms each comprising a main control electrical valve,
   fourth, fifth and sixth sub electrical valve circuits each comprising first, secod and third control elements,
   a negative common sub AC circuit system comprising first, second and third windings,
   means connecting the main DC circuit system between the positive common sub AC circuit system and the negative common sub AC circuit system,
   means connecting the first winding of the positive common sub AC circuit system to the first control element of each of the first, second and third sub electrical valve circuits,
   means connecting the second winding of the positive common sub AC circuit system to the second control element of each of the first, second and third sub electrical valve circuits,
   means connecting the third winding of the positive common sub AC circuit system to the third control element of each of the first, second and third sub electrical valve circuits,
   means connecting the first, second and third control elements of the first sub electrical valve circuit to the first positive commutating arm,
   means connecting the first, second and third control elements of the second sub electrical valve circuit to the second positive commutating arm,
   means connecting the first, second and third control elements of the third sub electrical valve circuit to the third positive commutating arm,
   means connecting the first positive commutating arm to a first terminal of the main AC circuit system,
   means connecting the second positive commutating arm to a second terminal of the main AC circuit system,
   means connecting the third positive commutating arm to a third terminal of the main AC circuit system,
   means connecting the first terminal of the main AC circuit system to the first negative commutating arm,
   means connecting the second terminal of the main AC circuit system to the second negative commutating arm,
   means connecting the third terminal of the main AC circuit system to the third negative commutating arm,
   means connecting the first negative commutating arm to the first, second and third control elements of the fourth sub electrical valve circuit,
   means connecting the second negative commutating arm to the first, second and third control elements of the fifth sub electrical valve circuit,
   means connecting the third negative commutating arm to the first, second and third control elements of the sixth sub electrical valve circuit,
   means connecting the first control element of each of the fourth, fifth and sixth sub electrical valve circuits to the first winding of the negative common sub AC circuit system,
   means connecting the second control element of each of the fourth, fifth and sixth sub electrical valve circuits to the second winding of the negative common sub AC circuit system,
   means connecting the third control element of the fourth, fifth and sixth sub electrical valve circuits to the third winding of the negative common sub AC circuit system.

5. Electrical apparatus comprising:
   a main DC circuit system,
   a first winding,
   first, second and third sub electrical valve circuits each comprising a non-control electrical valve and a control electrical valve,
   first, second and third positive commutating arms each comprising a main control electrical valve,
   a main AC circuit system, first, second and third negative commutating arms each comprising a main control electrical valve, fourth, fifth and sixth sub electrical valve circuits each comprising a non-control electrical valve and a control electrical valve, a second winding, means connecting a first terminal of the main DC circuit system to the first winding, means connecting the first terminal of the main DC circuit system to the first non-control electrical valve of the first, second and third sub electrical valve circuits, means connecting the first winding to the electrical control valve of the first, second adn third sub electrical valve circuits, means connecting the non-control electrical valve and the control electrical valve of the first sub electrical valve circuit to the first positive commutating arm, means connecting the non-control electrical valve and the control electrical valve of the second sub electrical valve circuit to the second positive commutating arm, means connecting the non-control electrical valve and the control electrical valve of the third sub electrical valve circuit to the third positive commutating arm, means connecting the first positive commutating arm to a first terminal of the main AC circuit system, means connecting the second positive commutating arm to a second terminal of the main AC circuit system, means connecting the third positive commutating arm to a third terminal of the main AC circuit system, means connecting the first terminal of the main AC circuit system to the first negative commutating arm, means connecting the second terminal of the main AC circuit system to the second negative commutating arm, means connecting the third terminal of the main AC circuit system to the third negative commutating arm, means connecting the first negative commutating arm to the non-control electrical valve and to the control electrical valve of the fourth sub electrical valve circuit, means connecting the fifth negative commutating arm to the non-control electrical valve and to the control electrical valve of the fifth sub electrical valve circuit, means connecting the third negative commutating arm to the non-control electrical valve and to the control electrical valve of the fifth sub electrical valve circuit, means connecting the control electrical valve of the fourth, fifth and sixth sub electrical valve circuits to the second winding, means connecting the non-control electrical valve of the fourth, fifth and sixth sub electrical valve circuits to a second terminal of the main DC circuit system.

6. Electrical apparatus comprising:

a main DC circuit system, a main AC circuit system comprising a primary winding and a secondary winding, first and second commutating arms, a sub electrical valve circuit comprising first, second and third control elements, a sub AC circuit system comprising first, second and third windings, means connecting a first terminal of the main DC circuit system to a center tap of the primary winding of the main AC circuit system, means connecting the first commutating arm between a first terminal of the primary winding of the main AC circuit system and a second terminal of the main DC circuit system, means connecting a second terminal of the primary winding of the main AC circuit system to the second commutating arm, means connecting the second commutating arm to the first, second and third control elements of the sub electrical valve circuit, means connecting the first control element of the sub electrical valve circuit to the first winding of the sub AC circuit system, means connecting the second control element of the sub electrical valve circuit to the second winding of the sub AC circuit system, means connecting the third control element of the sub electrical valve circuit to the third winding of the sub AC circuit system, means connecting the first winding of the sub AC circuit system to the second terminal of the main DC circuit system, means connecting the second winding of the sub AC circuit system to the second terminal of the main DC circuit system, means connecting the third winding of the sub AC circuit system to the second terminal of the main DC circuit system.

7. Electrical apparatus in accordance with claim 4 wherein the sub electrical valve circuits are bridge type sub electrical valve circuits and wherein the positive and negative common sub AC circuit systems are connected to the bridge type sub electrical valve circuits.

8. Electrical apparatus in accordance with claim 4 wherein the sub electrical valve circuits are of the double star type.

9. Electrical apparatus in accordance with claim 4 wherein the electrical valve circuits are of the three phase half waveform type having a fly wheel diode.

* * * * *